Figure 1:
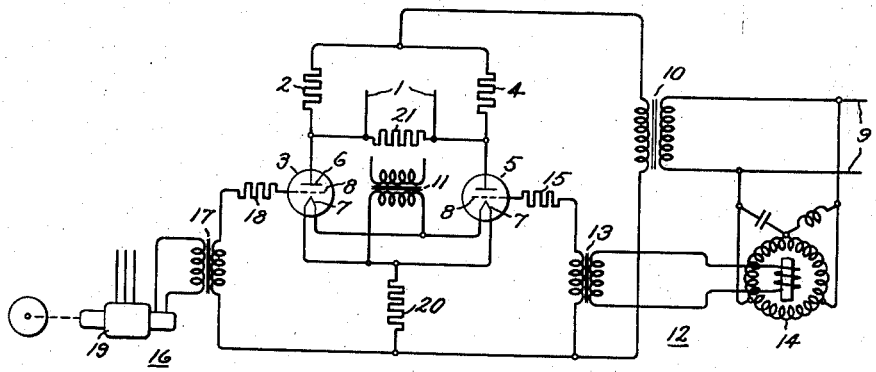

Nov. 12, 1940.   F. HÖLTERS   2,221,517
ELECTRIC VALVE CIRCUITS
Filed Dec. 7, 1938

Inventor:
Fritz Hölters;
by Harry E. Dunham
His Attorney.

Patented Nov. 12, 1940

2,221,517

UNITED STATES PATENT OFFICE 2,221,517

ELECTRIC VALVE CIRCUITS

Fritz Hölters, Berlin-Charlottenburg, Germany, assignor to General Electric Company, a corporation of New York Application December 7, 1938, Serial No. 244,463
In Germany December 29, 1937

17 Claims. (Cl. 250—27)

My invention relates to electric control circuits and more particularly to electric valve control circuits.

Electric valve apparatus has been employed in applications where it is desired to maintain a predetermined output characteristic within predetermined narrowly defined ranges of values. For example, electric valve translating apparatus has been employed to transfer electric power between alternating current circuits and between alternating current and direct current circuits and to control the voltage of one of the associated circuits. In many types of electric valve translating systems, it is important to maintain a predetermined phase relationship between a theoretical or standard voltage and a voltage which is impressed on the control members or grids of the electric valve translating apparatus, in order that the controlled output characteristic be maintained at the desired value. In accordance with the teachings of my invention described hereinafter, I provide new and improved electric control systems wherein a control circuit is energized in accordance with the relative phase displacement between a reference voltage and the actual voltage.

It is an object of my invention to provide new and improved electric valve circuits.

It is another object of my invention to provide new and improved electric valve circuits which control or indicate the order in which predetermined periodic voltages occur.

It is a further object of my invention to provide new and improved electric valve circuits for controlling or indicating phase displacement or phase coincidence between periodic voltages.

In accordance with the illustrated embodiments of my invention, I provide new and improved electric valve circuits for controlling the energization of a control circuit in accordance with the relative phase displacement between two periodic voltages, one of which may be a standard or reference voltage of invariable phase displacement, and the other of which may be an actual or controlled periodic voltage of variable phase displacement. In one embodiment of my invention, the electric valve circuit comprises a pair of electric paths which are energized from a source of alternating current. Each of the electric paths comprises an electronic discharge device of the controlled type having a control member for controlling the conductivity thereof. An excitation circuit impresses on the control member of one of the electronic discharge devices a periodic voltage of invariable phase displacement, and a second excitation circuit impresses on the control member of the other electronic discharge device a periodic voltage of variable phase displacement. The control circuit is energized in accordance with the difference in predetermined electrical quantities of the electric paths and is energized in accordance with the voltage appearing across an impedance element which is connected between the electric paths. The polarity of the voltage appearing across the impedance element varies in accordance with the order in which the periodic voltages occur. When there is substantial phase coincidence between the periodic voltages, the voltage appearing across the impedance element and the voltage impressed across the control circuit are substantially zero so that the circuit is not energized when this condition prevails. A resistance is connected in series relation with the electric paths and is connected to the excitation circuits to introduce therein a negative unidirectional biasing potential in response to the current conducted by the electric paths to permit only one of the electronic discharge devices to conduct current when the periodic voltages tend to render the discharge devices conductive at different times.

In another embodiment of my invention, I provide a pair of electric circuits each of which comprises an electronic discharge device and in which the electric circuits are united through a common impedance element. The control circuit is connected across the impedance element, and the polarity of the voltage impressed across the impedance element varies in accordance with the order in which the periodic control voltages occur. The electronic discharge devices conduct current through the impedance element in opposite directions. Each circuit includes a resistance which is connected in series relation with the electronic discharge device and is associated with the excitation circuit for the other electric valve to introduce therein a biasing potential tending to maintain the other discharge device nonconductive when the periodic voltages tend to render the electric valves conductive at different times. In this manner only one electronic discharge device is rendered conductive when there is substantial phase displacement between the periodic voltages.

Figure 3:
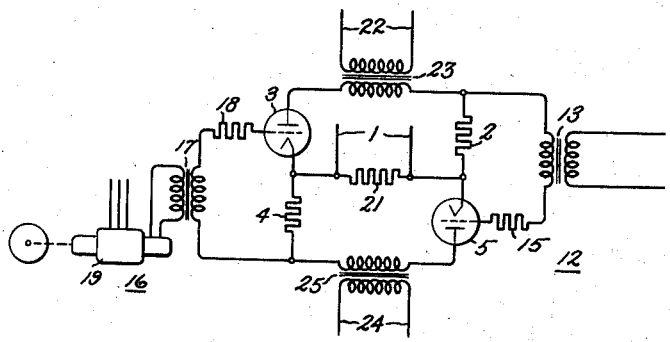
Figure 2:
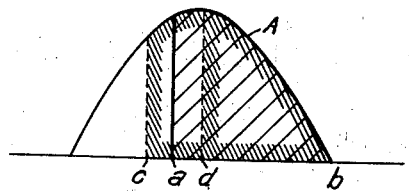

For a better understanding of my invention, reference may be had to the following description taken in connection with the accompanying drawing, and its scope will be pointed out in the appended claims. Figs. 1 and 3 diagrammatically illustrate several embodiments of my invention as applied to electric valve circuits for controlling or indicating the relative phase displacement between two periodic voltages, and Fig. 2 diagrammatically illustrates certain operating characteristics of the arrangements shown in Figs. 1 and 3.

Referring now to Fig. 1 of the accompanying drawing, my invention is there diagrammatically illustrated as applied to an electric valve circuit for controlling the energization of a control circuit 1 in response to the relative phase displacement between two periodic voltages, one of which may be a standard or reference voltage and the other of which may be the actual or controlled voltage. The electric valve circuit comprises a pair of electric paths, one of which may include a serially connected impedance element, such as a resistance 2 and an electronic discharge device 3, and the other of which includes a serially connected impedance element, such as a resistance 4 and an electronic discharge device 5. The electronic discharge devices 3 and 5 are preferably of the type employing an ionizable medium, such as a gas or a vapor, and each comprises an anode 6, a cathode 7 and a control member 8. The electric paths are energized from a suitable source of alternating current such as an alternating current circuit 9 through a transformer 10. A transformer 11 may be employed to energize the cathode heating elements for electric valves 3 and 5.

I provide an excitation circuit 12 associated with electronic discharge device 5 for impressing upon the control member 8 thereof a standard or reference periodic voltage of invariable phase displacement. The excitation circuit 12 may comprise a transformer 13 and means for establishing or setting the phase of the reference periodic voltage, such as a rotary phase shifter 14 which may be energized from any suitable source of alternating current. In Fig. 1 the rotary phase shifter 14 is shown as being connected to the alternating current circuit 9. A current limiting resistance 15 is connected in series relation with the control member 8.

To impress upon the control member 8 of the electronic discharge device 3 an actual or control voltage of variable phase displacement, I provide an excitation circuit 16 which comprises a transformer 17, a current limiting resistance 18 and a suitable phase shifting means such as a rotary phase shifter 19. The rotary phase shifter 19 may be operated in accordance with any predetermined controlling influence such as the voltage, power factor, current, or any other electrical condition or operating condition of translating apparatus (not shown).

As an agency for permitting only one of the electronic discharge devices 3 and 5 to conduct current when the periodic voltages supplied by excitation circuits 12 and 16 are displaced substantially in phase, I employ a means responsive to the conduction of current by the electronic discharge devices to introduce biasing potentials into the excitation circuits. More particularly, I provide a suitable impedance element, such as a resistance 20, which is connected in series relation with the electronic discharge devices 3 and 5 and which is connected in circuit with the secondary windings of transformers 13 and 17. The biasing potential introduced into the excitation circuits 12 and 16 by the resistance 20, of course, is present only when the electronic discharge devices 3 and 5 conduct current.

To impress on the control circuit 1 an electrical impulse the polarity of which varies in accordance with the relative order in which the periodic voltages of excitation circuits 12 and 16 occur, I provide a suitable impedance element, such as a resistance 21, which is connected across the parallel paths including electronic discharge devices 3 and 5. When both electronic discharge devices 3 and 5 conduct current, the potential difference across the resistance 21 is substantially zero. When only electronic discharge device 3 conducts current, the voltage impressed across the resistance 21 is of one polarity, and when only electronic discharge device 5 conducts current, the voltage appearing across the resistance 21 is of the opposite polarity. The resistance 21 is responsive to predetermined electrical conditions of the parallel paths. For example, the resistance 21 may be responsive to the difference in the currents transmitted by the parallel paths, or responsive to the difference in potential between the anodes 6 of the electronic discharge devices 3 and 5.

The embodiment of my invention shown in Fig. 1 may be arranged so that only one of the electronic discharge devices is rendered conductive when there is substantial phase displacement between the periodic voltages introduced into the excitation circuits 12 and 16. Of course, the circuits may be arranged by the proportioning of the resistance 20 so that the electronic discharge devices 3 and 5 are rendered conductive at different times during the cycles of applied anode-cathode voltage to permit both discharge devices to conduct current, the control being effected under such conditions by the difference of the currents conducted by the parallel paths, that is, by the difference of the currents conducted by the electronic discharge devices 3 and 5.

The operation of the embodiment of my invention diagrammatically illustrated in Fig. 1 will be explained by considering the system when it is desired to effect energization of the control circuit 1 in response to, or in accordance with, the relative phase order of the periodic voltages introduced into excitation circuits 12 and 16. If there is substantial phase coincidence between the periodic voltages impressed on the control members of electronic discharge devices 3 and 5, these discharge devices will be rendered conductive substantially simultaneously and the net voltage appearing across the resistance 21 will be substantially zero. Of course, the control circuit 1 will not be energized. However, if the voltage of variable phase displacement provided by excitation circuit 16 advances in phase relative to the periodic voltage of excitation circuit 12, electronic discharge device 3 will be rendered conductive prior to the electronic discharge device 5, so that an electrical impulse of predetermined polarity is applied to the control circuit 1. On the other hand, if the periodic voltage supplied by the excitation circuit 16 is retarded in phase relative to the periodic voltage of excitation circuit 12, the electronic discharge device 5 will be rendered conductive prior to the electronic discharge device 3, impressing upon the control circuit 1 an electrical impulse of opposite polarity.

The manner in which the arrangement of Fig. 1 controls the polarity of the voltage impressed across the terminals of the resistance 21, and hence controls the polarity of the voltage supplied to the control circuit, may be better understood by referring to Fig. 2. Curve A of Fig. 2 represents the anode-cathode voltages applied to the electronic discharge devices 3 and 5. When the electronic discharge devices 3 and 5 are rendered conductive at the same time, as, for example, at time $a$, both discharge devices conduct the same amount of current as represented by the shaded portion of curve A lying between points $a$ and $b$. Under this condition, there is no voltage impressed across the terminals of resistance 21. However, if one of the discharge devices, as, for example, discharge device 3 is rendered conductive at an earlier time during the cycle of applied anode-cathode voltage, as, for example, at time $c$, it is clear that the average current conducted by the associated electric path is correspondingly increased. Therefore, if the electronic discharge device 3 is rendered conductive at time $c$ and the electronic discharge device 5 is rendered conductive at time $a$, the average currents conducted by the associated paths are correspondingly different and impress across the terminals of resistance 21 a voltage of predetermined polarity. However, if the electronic discharge device 3 is rendered conductive at time $d$, the average current conducted by the electronic discharge device 5 exceeds that conducted by the discharge device 3, impressing across the terminals of resistance 21 an impulse of voltage of opposite polarity. It is to be understood that the difference of the currents conducted by the electric paths influences the polarity of the voltage difference impressed across the terminals of resistance 21 due to the flow of current through resistances 2 and 4.

The resistance 21 may be proportioned so that the magnitude of the voltage appearing thereacross when one of the discharge devices 3 and 5 is conductive is sufficient to maintain the other discharge device nonconductive, so that only one of the discharge devices may be rendered conductive when the periodic voltage tends to render the discharge devices conductive at different times. Under this condition of operation, the electronic discharge device on the control member of which there is impressed the leading periodic voltage is the only one rendered conductive. Of course, the polarity of the voltage appearing across the terminals of the resistance 21 is controlled by the conduction of electronic discharge devices 3 and 5. When electronic discharge device 3 is conductive, the voltage across resistance 21 is of one polarity, and when the electronic discharge device 5 is conductive the voltage appearing across resistance 21 is of the opposite polarity.

In Fig. 3 another embodiment of my invention is shown which is a modification of the arrangement shown in Fig. 1, and corresponding elements have been assigned like reference numerals. I provide a pair of electric circuits including electronic discharge devices 3 and 5, and which are united through a common impedance element such as the resistance 21. The control circuit 1 is connected across the resistance 21 and is energized by electrical impulses, the polarity of which varies in accordance with the relative order in which the periodic voltages of excitation circuits 12 and 16 occur. One of the electric circuits is energized from a suitable source of alternating current 22 through a transformer 23, and the other circuit is energized from a suitable source of alternating current 24 through a transformer 25. Resistances 2 and 4 are connected in the electric circuits in series relation with electronic discharge devices 3 and 5, respectively, to introduce into the excitation circuits 12 and 16, respectively, biasing potentials in response to the current conducted by the electronic discharge devices 3 and 5, respectively. The electronic discharge devices 3 and 5 are connected to transmit current in different directions through the resistance 21. Therefore, the resultant voltage appearing across the terminals of the resistance 21 and hence the polarity of the voltage supplied to control circuit 1 is dependent upon the relative currents conducted by the electronic discharge devices 3 and 5. In other words, the polarity of the voltage supplied to the control circuit 1 is dependent upon the time during the cycle of anode-cathode voltage at which the discharge devices 3 and 5 are rendered conductive.

The embodiment of my invention shown in Fig. 3 operates to supply to the control circuit 1 impulses of voltage the polarity of which is controlled by the relative order of the periodic voltages introduced into excitation circuits 12 and 16. When there is substantial phase coincidence between the periodic voltages of these excitation circuits, electronic discharge devices 3 and 5 are rendered conductive substantially simultaneously so that no voltage is supplied to the control circuit 1. However, if there is substantial phase displacement between the periodic voltages, the average currents conducted by the electronic discharge devices 3 and 5 are different in magnitude, producing across the terminals of resistance 21 a resultant voltage which is supplied to circuit 1. Of course, the resistances 2 and 4 may be proportioned to introduce into excitation circuits 12 and 16 biasing potentials of sufficient magnitude to render the periodic voltages supplied by transformers 13 and 17 ineffective when electric valves 3 and 5 tend to conduct current at different times. That is, if the periodic voltage of circuit 16 leads the periodic voltage of circuit 12, electronic discharge device 3 is rendered conductive and introduces into the excitation circuit 12 a biasing potential which maintains the electronic discharge device 5 nonconductive during the remainder of that half-cycle of applied anode-cathode voltage. On the other hand, if the periodic voltage of circuit 16 lags the periodic voltage of circuit 12, electronic discharge device 5 is rendered conductive and resistance 4 introduces into excitation circuit 16 a biasing potential to maintain discharge device 3 nonconductive during the remainder of that half-cycle of applied anode-cathode voltage. Of course, under these two conditions the resultant voltage impressed across control circuit 1 is of opposite polarity and is an indication of the phase order in which the periodic voltages have occurred.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patents of the United States is:

1. In combination, a control circuit, an alternating current circuit, means for producing a periodic voltage of invariable phase displacement relative to the voltage of said alternating current circuit, means for producing a periodic voltage of variable phase displacement relative to the voltage of said alternating current circuit, and means for effecting energization of said control circuit only when said periodic voltages are displaced relative to each other and comprising a pair of electric paths energized from said alternating current circuit and each including an electronic discharge device, said discharge devices each being controlled in accordance with a different one of said periodic voltages.

2. In combination, a control circuit, an alternating current circuit, means for producing a periodic voltage of invariable phase displacement relative to the voltage of said alternating current circuit, means for producing a periodic voltage of variable phase displacement relative to the voltage of said alternating current circuit, means for effecting energization of said control circuit only when said periodic voltages are displaced relative to each other and comprising a pair of electric paths energized from said alternating current circuit and each including an electronic discharge device, and means for controlling each of said discharge devices in accordance with a different one of said periodic voltages so that both discharge devices are rendered conductive when there is substantial phase coincidence of said periodic voltages and so that only one of said discharge devices is rendered conductive when there is substantial phase displacement between said periodic voltages.

3. In combination, a source of periodic current, a pair of electric paths each of which comprises an electronic discharge device of the controlled type having a control member for controlling the conductivity thereof, means for energizing said electric paths, means for impressing on the control member of one of said discharge devices a periodic voltage of invariable phase displacement relative to the voltage of said source, means for impressing on the control member of the other discharge device a periodic voltage of variable phase displacement, means for impressing on said control members a potential tending to maintain one of said discharge devices nonconductive when said periodic voltages tend to render said discharge devices conductive at different times, and means responsive to predetermined electrical conditions of said pair of electric paths.

4. In combination, a source of periodic current, a pair of electric paths each of which comprises an electronic discharge device of the controlled type having a control member for controlling the conductivity thereof, means for energizing said electric paths, means for impressing on the control member of one of said discharge devices a periodic voltage of invariable phase displacement relative to the voltage of said source, means for impressing on the control member of the other discharge device a periodic voltage of variable phase displacement, a control circuit, and means for effecting energization of said control circuit only when said periodic voltages are displaced in time relationship and comprising an impedance element connected across said electric paths.

5. In combination, a pair of electric paths each of which comprises an electronic discharge device of the controlled type having a control member for controlling the conductivity thereof, means for energizing said electric paths and including an alternating current source, means for impressing on the control member of one of said discharge devices a periodic voltage of invariable phase displacement relative to the voltage of said source, means for impressing on the control member of the other discharge device a periodic voltage of variable phase displacement relative to the voltage of said source, a control circuit, and means for transmitting to said control circuit an electrical impulse the polarity of which is determined by the phase displacement of said periodic voltages relative to the voltage of said source.

6. In combination, a source of alternating current, means connected to be energized from said source and comprising a pair of electric paths each comprising an electronic discharge device of the controlled type having a control member for controlling the conductivity thereof, an excitation circuit for impressing on the control member of one of said discharge devices a periodic voltage of predetermined invariable phase displacement relative to the voltage of said source, a second excitation circuit for impressing on the control member of the other discharge device a periodic voltage of variable phase displacement, an impedance element connected in series relation with said paths for introducing into said excitation circuits a potential to maintain one of said discharge devices nonconductive when the other of said discharge devices is rendered conductive, and means responsive to the difference in currents transmitted by said electric paths.

7. In combination, a source of alternating current, means connected to be energized from said source and comprising a pair of electric paths each comprising an electronic discharge device of the controlled type having a control member for controlling the conductivity thereof, an excitation circuit for impressing on the control member of one of said discharge devices a periodic voltage of predetermined invariable phase displacement relative to the voltage of said source, a second excitation circuit for impressing on the control member of the other discharge device a periodic voltage of variable phase displacement, an impedance element connected in series relation with said electric paths for introducing into said excitation circuits a potential which maintains one of said discharge devices nonconductive when said periodic voltages tend to render said discharge devices conductive at different times, and a control circuit responsive to the difference in currents transmitted by said electric paths.

8. In combination, an alternating current circuit, an impedance element, means connected in series relation with said circuit and said impedance element and comprising a pair of electric paths, each of said electric paths comprising an electronic discharge device of the controlled type having a control member for controlling the conductivity thereof, means for impressing on the control member of one of said discharge devices a periodic voltage of invariable phase displacement relative to the voltage of said alternating current circuit, means for impressing on the control member of the other discharge device a periodic voltage of variable phase displacement, said impedance element being connected to bias one of said discharge devices to a nonconductive condition when there is substantial phase displacement between said periodic voltages, and an electric circuit responsive to the difference of currents transmitted by said electric paths.

9. In combination, a source of alternating current, an impedance element, means connected in series relation with said source and said impedance element and comprising a pair of electric paths each including an electronic discharge device of the controlled type having a control member for controlling the conductivity thereof, an excitation circuit for impressing on the control member of one of said discharge devices a periodic voltage of invariable phase displacement relative to the voltage of said source, a second excitation circuit for impressing on the control member of the other discharge device a periodic voltage of variable phase displacement, said impedance element being connected to impress a negative unidirectional biasing potential on said control members when one or more of said electric paths conduct current, and means connected across said electric paths and responsive to the difference in currents conducted by said electric paths.

10. In combination, an alternating current circuit, an impedance element, means connected in series relation with said circuit and said impedance element and comprising a pair of electric paths, each of said electric paths comprising in series relation a resistance and an electronic discharge device of the controlled type having a control member for controlling the conductivity thereof, means for impressing on the control member of one of said discharge devices a periodic voltage of invariable predetermined phase displacement relative to the voltage of said alternating current circuit, means for impressing on the control member of the other discharge device a periodic voltage of variable phase displacement, and means responsive to the difference between voltages derived from said electric paths.

11. In combination, a source of alternating current, means connected to be energized from said source and comprising a pair of electric paths each including an electronic discharge device of the controlled type having a control member for controlling the conductivity thereof, an excitation circuit for impressing on the control member of one of the discharge devices a periodic voltage of invariable phase displacement relative to the voltage of said source, a second excitation circuit for impressing on the control member of the other discharge device a periodic voltage of variable phase displacement, an impedance element connected in series relation with said electric paths for introducing into said excitation circuits a potential which maintains one of said discharge devices nonconductive when said periodic voltages tend to render said discharge devices conductive at different times, a control circuit, and means for transmitting to said control circuit an electrical impulse the polarity of which is controlled by the relative phase displacement between said periodic voltages.

12. In combination, a source of alternating current, means connected to be energized from said source and comprising a pair of electric paths each including an electronic discharge device of the controlled type having a control member for controlling the conductivity thereof, an excitation circuit for impressing on the control member of one of the discharge devices a periodic voltage of invariable phase displacement relative to the voltage of said source, a second excitation circuit for impressing on the control member of the other discharge device a periodic voltage of variable phase displacement, an impedance element connected in series relation with said electric paths for introducing into said excitation circuits a potential which maintains one of said discharge devices nonconductive when said electronic discharge devices are not rendered conductive simultaneously, and a control circuit connected across said electric paths and which is energized only when one of said discharge devices is conductive.

13. In combination, a control circuit, a pair of electric circuits connected to said control circuit and each comprising an electronic discharge device of the controlled type having a control member for controlling the conductivity thereof and means for energizing said electronic discharge device including a source of alternating current, means for impressing on the control member of one of said discharge devices a periodic voltage of invariable phase displacement relative to the voltage of the associated source, means for impressing on the control member of the other of said discharge devices a periodic voltage of variable phase displacement relative to the voltage of the associated source, and means for impressing on said control circuit an electrical impulse the polarity of which varies in accordance with the order in which said periodic voltages occur comprising an impedance element connected in both of said electric circuits.

14. In combination, a source of alternating current, a control circuit, a pair of electric circuits each including a source of alternating current and a serially connected electronic discharge device and a resistance, each of said discharge devices being provided with a control member for controlling the conductivity thereof, an excitation circuit for impressing on the control member of one of said discharge devices a periodic voltage of invariable displacement relative to the voltage of said source and being connected between the control member and the resistance associated with the other electronic discharge device, a second excitation circuit for impressing on the control member of said other electronic discharge device a periodic voltage of variable phase displacement, and means comprising an impedance element connected in both of said pair of electric circuits for impressing on said control circuit an electrical impulse the polarity of which is determined by the order in which said periodic voltages occur.

15. In combination, an impedance element, a control circuit connected across said impedance element, a pair of electric circuits connected across said impedance element and each comprising a source of alternating current and a serially connected resistance and an electronic discharge device, the electronic discharge devices being of the type including a control member for controlling the conductivity thereof and being connected to transmit current in different directions through said impedance element, an excitation circuit for impressing on the control member of one of said discharge devices a periodic voltage of invariable phase displacement relative to the voltage of said source and being connected between the control member and the resistance associated with the other electronic discharge device, and a second excitation circuit for impressing on the control member of said other discharge device a periodic voltage of variable phase displacement.

16. In combination, a control circuit, an impedance element connected across said control circuit, a pair of electric circuits connected across said impedance element and each comprising a source of alternating current and an electronic discharge device of the type having a control member for controlling the conductivity thereof, the electronic discharge devices being connected to conduct current in opposite directions through said impedance element, an excitation circuit for impressing on the control member of one of said discharge devices a periodic voltage of invariable phase displacement relative to the voltage of the associated source, a second excitation circuit for impressing on the control member of the other discharge device a periodic voltage of variable phase displacement relative to the voltage of the associated source, and means for introducing into said excitation circuits potentials to maintain one of said discharge devices nonconductive when said periodic voltages tend to render said discharge devices conductive at different times.

17. In combination, a control circuit, an impedance element connected across said control circuit, a pair of electric circuits connected across said impedance element and each comprising a source of alternating current and an electronic discharge device of the type having a control member for controlling the conductivity thereof, the electronic discharge devices being connected to conduct current in opposite directions through said impedance element, an excitation circuit for impressing on the control member of one of said discharge devices a periodic voltage of invariable phase displacement relative to the voltage of the associated source, a second excitation circuit for impressing on the control member of the other discharge device a periodic voltage of variable phase displacement relative to the voltage of the associated source, and means for introducing into each of said excitation circuits a biasing potential due to the conduction of current by the other electronic discharge device.

FRITZ HÖLTERS.